United States Patent [19]

Marinoni et al.

[11] 4,425,939

[45] Jan. 17, 1984

[54] VALVE FOR ADJUSTING THE CLOSING SPEED OF A DOOR CLOSER

[75] Inventors: Mario Marinoni; Mirko Marinoni, both of Magenta, Italy

[73] Assignee: Casma di V. Marinoni & Figli, Magenta, Italy

[21] Appl. No.: 328,509

[22] Filed: Dec. 8, 1981

[30] Foreign Application Priority Data

May 5, 1981 [DE] Fed. Rep. of Germany ....... 3117730

[51] Int. Cl.[3] .............................................. F16K 15/14

[52] U.S. Cl. .............................. 137/599.2; 137/625.3; 137/843; 138/43; 138/45

[58] Field of Search ........... 137/625.3, 625.28, 614.18, 137/614.2, 599.2, 843, 852; 251/127, 118, 325; 210/131, 238; 138/42, 43, 45; 239/533.13

[56] References Cited

U.S. PATENT DOCUMENTS 4,182,356 1/1980 Woodford, Sr. ................. 137/599.2

FOREIGN PATENT DOCUMENTS 2240389 3/1975 France ................................ 137/843

511403 1/1955 Italy .................................... 251/215

*Primary Examiner*—Martin P. Schwadron

*Assistant Examiner*—James R. Shay

*Attorney, Agent, or Firm*—Toren, McGeady and Stanger

[57] ABSTRACT

A valve for adjusting the closing speed of a door closer includes a generally cylindrical valve member having a tubular portion and a solid portion. The valve member is received with sliding contact in a blind-end bore of a valve body. The wall of the tubular portion of the valve member has an opening which is positionable into communication with an inlet conduit provided in the valve body in such a way that an axial adjustment of the valve member changes the cross-sectional area of the passage created between the inlet conduit and the opening. A body of elastic foam material with closed-wall cells is arranged in the interior of the tubular portion and is placed across the opening. In operation, fluid flowing through the valve applies pressure to the body and presses it away from the opening, so that the fluid can flow between the wall of the tubular portion and the body of elastic foam material without creating a hissing sound.

6 Claims, 2 Drawing Figures

VALVE FOR ADJUSTING THE CLOSING SPEED OF A DOOR CLOSER

BACKGROUND OF THE INVENTION

The present invention relates generally to a valve for adjusting the closing speed of a door closer, and more particularly to a valve of the type wherein an axially extending generally cylindrical valve member having a tubular portion and a solid portion is received with sliding contact in a blind-end bore of a valve body which includes inlet and outlet conduits opening into the bore. The valve member is axially adjustable in the blind-end bore. The wall of the tubular portion has an opening spaced axially from the open end of the tubular portion. The inlet conduit and the opening are located so as to be positionable into communication in such a way that an axial adjustment of the valve member changes the cross-sectional area of the passage created between the inlet conduit and the opening.

In known valves of this type, an unpleasant hissing sound is produced when fluid passes through the opening in the wall of the tubular portion during opening and closing. These valves have the additional disadvantage that the opening is occasionally clogged due to the accumulation of dirt or other foreign substances.

It is, therefore, an object of the invention to provide a valve for adjusting the closing speed of a door closer which operates without the hissing sound described above.

SUMMARY OF THE INVENTION

In accordance with the present invention, the valve for adjusting the closing speed of a door closer includes an axially extending, generally cylindrical valve member having a tubular portion and a solid portion following one another in axial direction, the end of the tubular portion facing away from the solid portion being open and the wall of the tubular portion extending in axial direction. The wall of the tubular portion has an opening spaced axially from the open end of the tubular portion. The valve member is axially adjustable with sliding contact in a blind-end bore of a valve body, the open end of the tubular portion facing the end of the blind-end bore. The valve body includes inlet and outlet conduits opening into the bore. The inlet conduit and the opening are located so as to be positionable into communication in such a way that an axial adjustment of the valve member changes the cross-sectional area of the passage created between the inlet conduit and the opening. A body of elastic foam material with closed-wall cells is arranged in the interior of the tubular portion and is placed across the opening.

The body of elastic foam material closes the opening in the wall of the tubular portion when the door closer is in operation. However, during operation, the fluid flowing through the valve applies pressure to the body and presses it away from the opening, so that the fluid can flow between the wall of the tubular portion and the body of elastic foam material without creating a hissing sound.

In accordance with another feature of the invention, the outer diameter of the tubular portion of the valve member diminishes in the direction of its open end, beginning at an axial distance from the opening toward the open end of the tubular portion. As a result, the valve can be kept operative even when the opening is clogged by axially moving the valve member in the direction out of the blind-end bore to such an extent that the inlet conduit faces the tapering part of the tubular portion and the fluid can flow through the annular space between the wall of the blind-end bore and the outer surface of the tubular portion.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
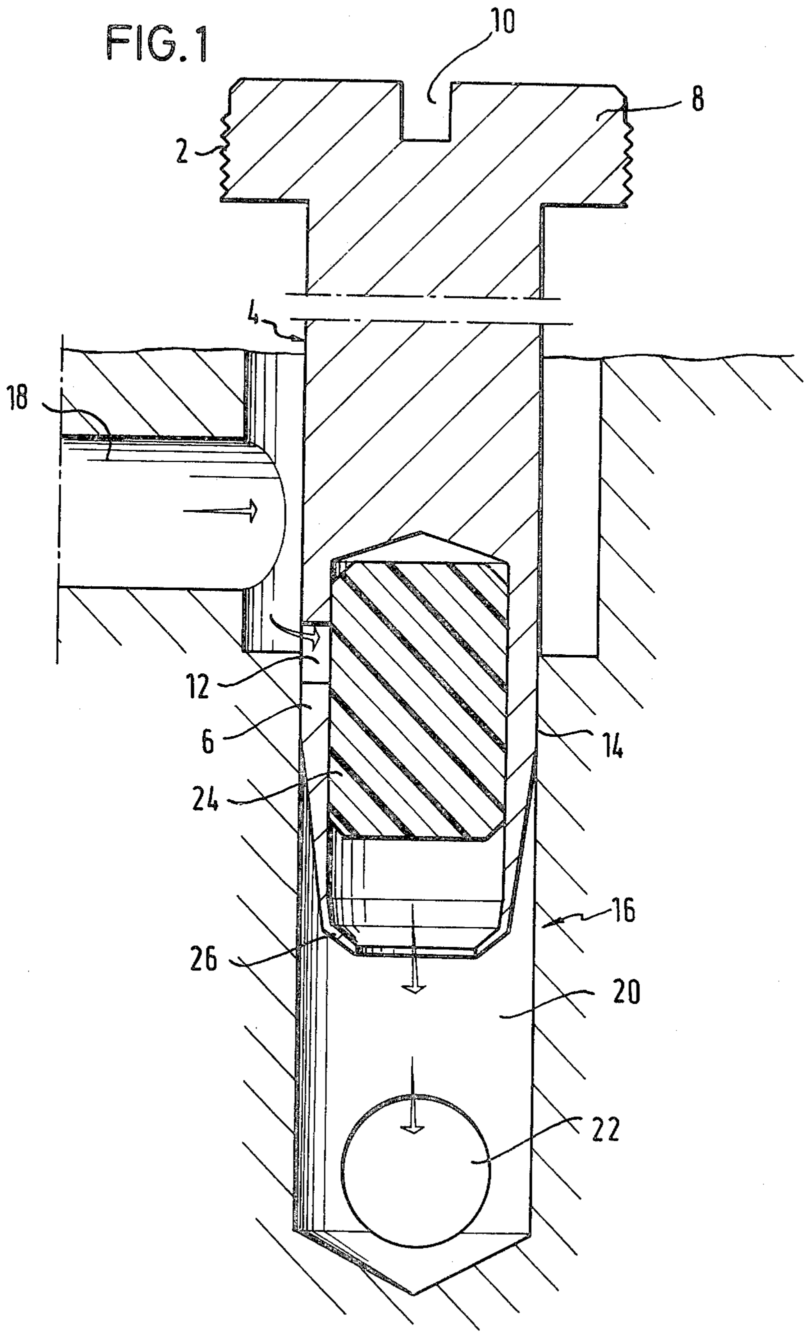
FIG. 1 is a sectional view of a valve in accordance with the present invention, illustrated in the normal operating position.

A suggestion for the installation of the valve in accordance with the present invention is described in West German Offenlegungsschrift No. 26 28 441.

As illustrated in the drawing, the valve in accordance with the present invention includes an axially extending generally cylindrical valve member 4. The valve member 4 has a solid portion with a head 8 and a tubular portion 6. The side 2 of the head 8 is formed so as to be capable of engagement in a screw connection with a guide means, not shown, for the axial adjustment of the valve member 4. A slot 10 provided for the engagement of a screwdriver is formed in the end face of the head 8. The valve member 4 is received with sliding contact in a blind-end bore 16 of a valve body 16 which further includes an inlet conduit 18 and an outlet conduit 22 which open into the blind-end bore.

At an axial distance from the open end of the tubular portion 6, an opening 12 is provided in the wall of the tubular portion 6, the opening 12 being located so as to be positionable into communication with the inlet conduit 18 in such a way that an axial adjustment of the valve member 4 changes the cross-sectional area of the passage created between the inlet conduit 18 and the opening 12.

The open end of the tubular portion 6 faces a space 20 of the blind-end bore 14, the outlet conduit 22 opening into this space 20.

A body 24 of elastic foam material with closed-wall cells is arranged in the interior of the tubular portion 6 and is placed across the opening 12. As illustrated in the drawing, the body 24 has a diameter which is equal to the internal diameter of the tubular portion 6. During operation of the valve, fluid conducted through the inlet conduit 18 flows through the opening 12 and presses the body 24 away from the wall of the tubular portion 6, so that the fluid flows between the wall of the tubular portion 6 and the body 24 toward the open end of the tubular portion 6.

Beginning at an axial distance from the opening 12 toward the open end of the tubular portion 6, the outer diameter of the tubular portion 6 of the valve member 4 diminishes in the direction of its open end. The tubular portion 6 is provided with an annular rim 26 extending inwardly over the open end which serves to prevent the body 24 from dropping out of the interior of the tubular portion 6.

In FIG. 1, the valve is shown in the normal operating position. The direction of flow of the fluid through the valve is indicated by arrows.

Figure 2:
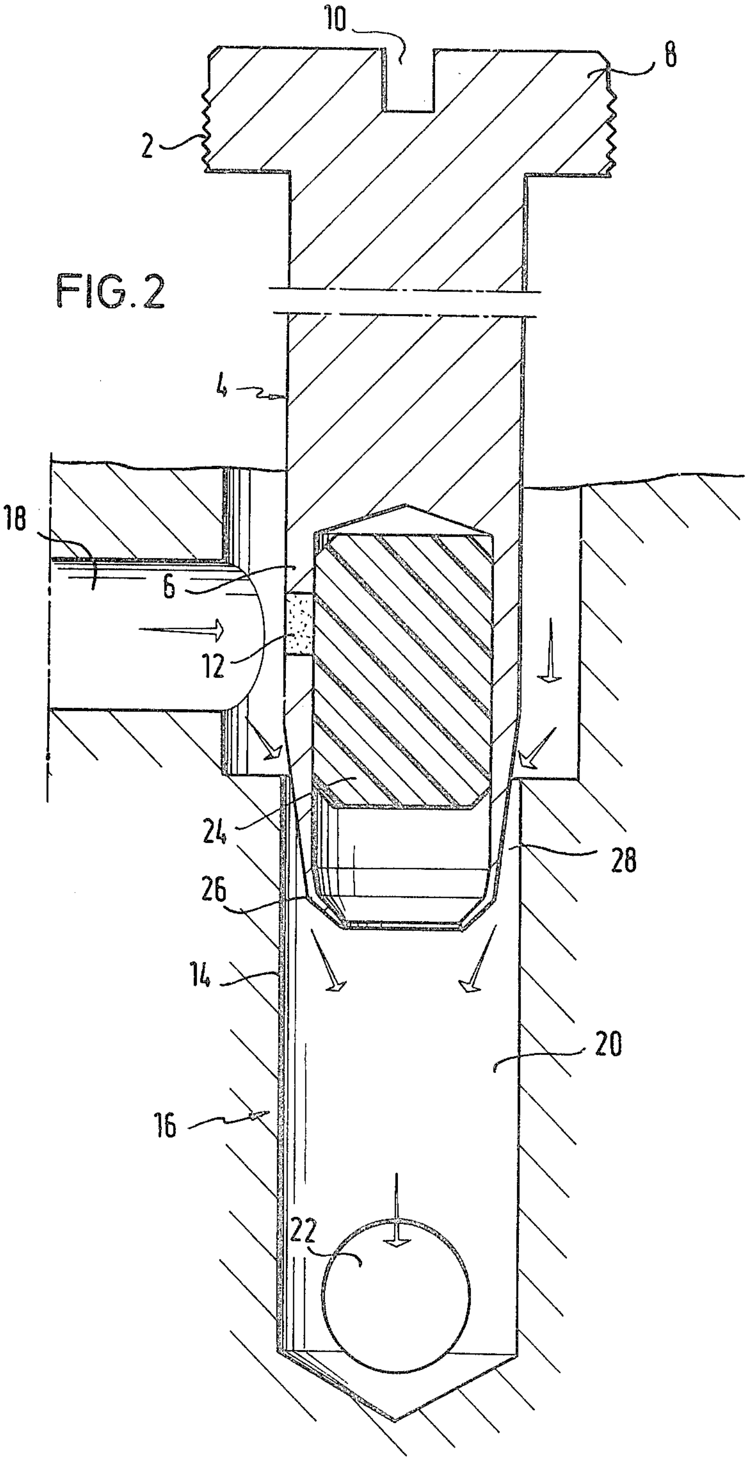
FIG. 2 is a sectional view of the valve illustrated in FIG. 1 with the valve member adjusted so that the valve is operative when the opening in the tubular portion of the valve member is clogged.

FIG. 2 shows the valve according to the invention essentially as illustrated in FIG. 1 but with the valve member 4 adjusted axially outwardly from the blind-end bore 14 to such an extent that an annular space 28 is formed between the surface of the bore 14 and the outer surface of the tapered part of the tubular portion 6. If the opening 12 in the tubular portion 6 is clogged, as shown in FIG. 2, the fluid can flow from the inlet duct 18 through the annular space 28 toward the outlet conduit 22, as indicated by arrows.

While the specific embodiment of the invention has been shown and described in detail to illustrate the application of the inventive principles, it will be understood that the invention may be embodied otherwise without departing from such principles.

We claim:

1. A valve for adjusting the closing speed of a door closer, comprising an axially extending, generally cylindrical valve member having a tubular portion and a solid portion following one another in axial direction, the end of said tubular portion facing away from said solid portion being open and the wall of said tubular portion extending in the axial direction of said valve member, said wall having an opening spaced axially from said open end of said tubular portion, a valve body defining a blind-end bore, said valve member being axially adjustable in said bore with sliding contact between said wall and the surface of said bore, the open end of said tubular portion facing the end of said blind-end bore, said valve body including inlet and outlet conduits opening into said bore, said inlet conduit and said opening being located so as to be positionable into communication in such a way that an axial adjustment of said valve member changes the cross-sectional area of the passage created between said inlet conduit and said opening, wherein the improvement comprises a body of elastic foam material arranged in the interior of said tubular portion and placed across said opening.

2. A valve in accordance with claim 1, comprising an annular rim extending inwardly over said open end of said tubular portion.

3. A valve in accordance with claim 1, wherein the diameter of said body of elastic foam material is equal to the inside diameter of said tubular portion.

4. A valve in accordance with claim 1, wherein the material of said body is an elastic foam material with closed-wall cells.

5. A valve in accordance with claim 1, wherein the outer diameter of said tubular portion diminishes toward said open end beginning at an axial distance from said opening toward said open end.

6. A valve in accordance with claim 1, wherein said solid portion includes a head provided at the end facing away from said tubular portion, the side of said head being formed so as to be capable of engagement in a screw connection with a guide means.

* * * * *